US011859425B2

(12) United States Patent
Krüger

(10) Patent No.: US 11,859,425 B2
(45) Date of Patent: Jan. 2, 2024

(54) DOUBLE-LEAF DOOR DEVICE FOR A VEHICLE

(71) Applicant: Siemens Mobility GmbH, Munich (DE)

(72) Inventor: Axel Krüger, Wennigsen (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/927,950

(22) PCT Filed: Apr. 28, 2021

(86) PCT No.: PCT/EP2021/061104
§ 371 (c)(1),
(2) Date: Nov. 28, 2022

(87) PCT Pub. No.: WO2021/239366
PCT Pub. Date: Dec. 2, 2021

(65) Prior Publication Data

US 2023/0193675 A1 Jun. 22, 2023

(30) Foreign Application Priority Data

May 28, 2020 (DE) ..................... 10 2020 206 675.2

(51) Int. Cl.
*E05D 15/28* (2006.01)
*E05D 15/06* (2006.01)
(Continued)

(52) U.S. Cl.
CPC ........... *E05D 15/0652* (2013.01); *B61D 1/06* (2013.01); *E05D 15/28* (2013.01); *E05F 15/643* (2015.01);
(Continued)

(58) Field of Classification Search
CPC ....... E05D 15/0652; E05D 15/28; B61D 1/06; E05F 15/643; E05F 15/632;
(Continued)

(56) References Cited

U.S. PATENT DOCUMENTS 2,811,932 A * 11/1957 Clary ....................... B61D 1/06 105/340
4,259,810 A 4/1981 West
(Continued)

FOREIGN PATENT DOCUMENTS

AT 515253 A1 7/2015
CN 205713631 U * 11/2016
(Continued)

*Primary Examiner* — Mark T Le
(74) *Attorney, Agent, or Firm* — Laurence A. Greenberg; Werner H. Stemer; Ralph E. Locher

(57) ABSTRACT

A door device for the interior of a passenger transport vehicle, and a passenger transport vehicle having at least one door device. The device includes a double-leaf sliding door with a first door leaf and a second door leaf in one plane. The door device has an upper guide for the first door leaf and an upper guide for the second door leaf. The guides are parallel with one another, and at least the upper guide for the first door leaf is offset with respect to the plane of the first and the second door leaf.

13 Claims, 2 Drawing Sheets

(51) Int. Cl.

*E05F 15/643* (2015.01)
*B61D 1/06* (2006.01)

(52) U.S. Cl.

CPC ... *E05Y 2201/434* (2013.01); *E05Y 2201/624* (2013.01); *E05Y 2201/652* (2013.01); *E05Y 2201/656* (2013.01); *E05Y 2201/66* (2013.01); *E05Y 2201/668* (2013.01); *E05Y 2201/684* (2013.01); *E05Y 2900/51* (2013.01)

(58) Field of Classification Search

CPC . E05F 2017/005; E05F 15/646; E05F 15/652; E05F 5/003; E05F 15/655; E05F 15/638; E05F 1/16; E05F 15/56; E05Y 2201/434; E05Y 2201/624; E05Y 2201/652; E05Y 2201/656; E05Y 2201/66; E05Y 2201/668; E05Y 2201/684; E05Y 2900/51

See application file for complete search history.

(56) References Cited

U.S. PATENT DOCUMENTS

| | | | | |
|---|---|---|---|---|
| 6,539,669 | B1 * | 4/2003 | Heidrich | E05F 15/652 49/213 |
| 8,978,301 | B2 * | 3/2015 | Ueda | E05B 81/13 292/201 |
| 9,874,050 | B2 * | 1/2018 | Mair | E05F 15/00 |

FOREIGN PATENT DOCUMENTS

| | | | | |
|---|---|---|---|---|
| CN | 110552586 | A | 12/2019 | |
| DE | 19819558 | A1 | 11/1999 | |
| DE | 102014213625 | A1 | 1/2016 | |
| EP | 0023427 | A1 | 2/1981 | |
| EP | 2634063 | A1 | 9/2013 | |
| WO | WO-2010108664 | A1 * | 9/2010 | B60J 5/108 |
| WO | WO 2010130537 | A1 | 11/2010 | |

* cited by examiner

DOUBLE-LEAF DOOR DEVICE FOR A VEHICLE

FIELD AND BACKGROUND OF THE INVENTION

The invention relates to a door device for the interior of a passenger transport vehicle, and to a passenger transport vehicle having at least one door device, the device comprising a double-leaf sliding door having a first door leaf and having a second door leaf in one plane.

Internal doors in rail vehicles often serve for dividing passenger areas. To this end, generic double-leaf sliding doors are also used.

EP 2 634 063 A1 discloses a solution for internal sliding doors for rail vehicles which requires only a small amount of installation space in the vehicle longitudinal direction for the guide rails of the door leaves.

In particular in double-decker vehicles, due to the highly curved shell structure in the roof region little installation space is available in the upper deck for the internal door drives, in particular in a vertical axis of the vehicle at the sides of the vehicle.

SUMMARY OF THE INVENTION

The object of the invention is to specify a door arrangement which takes up only a small amount of installation space in the width.

The object is achieved by the claimed invention. Developments and embodiments of the invention are found in the features of the dependent claims.

A door device according to the invention is configured in a suitable manner for an interior of a passenger transport vehicle, and comprises a first door leaf and a further second door leaf which are located in a common plane and are displaceable within this plane. For opening the closed door device, the door leaves are pushed apart in opposing directions to one another from a closed position into an open position. For closing the open door device, the door leaves are pushed together uniformly in opposing directions to one another from the open position into the closed position. The front main closing edges of the door leaves, which mutually face one another, bear flush against one another in the closed position.

According to the invention, the door device further comprises an upper guide for the first door leaf and an upper guide for the second door leaf, which guides are arranged in parallel to one another and, in particular, also parallel to the plane in which the door leaves are located. The plane in which the door leaves are located can also be denoted as the door leaf plane. At least one upper guide is arranged offset with respect to the door leaf plane. Thus the upper guide has a spacing of greater than zero, measured perpendicular to the door leaf plane. The upper guide for the first door leaf can also be denoted as the first guide and the upper guide for the second door leaf can also be denoted as the second guide. In particular, both the first guide and the second guide are arranged offset with respect to the door leaf plane.

The invention further relates to a passenger transport vehicle, in particular a track-bound vehicle, for example a rail vehicle, comprising at least one door device according to the invention. The door device is provided, in particular, in an interior of the public passenger transport vehicle between two interior parts, for example for separating two passenger compartments. The door device thus acts as an internal door. The door leaf plane runs, for example, vertically in the vehicle transverse direction. The door leaves can then be displaced in the vehicle transverse direction.

The upper guides can be designed identically or structurally the same. The upper guides can be configured in each case as a straight guide, in particular as a linear guide, and as a development comprise in each case at least one guide rail and in each case at least one sliding or running body which is guided along the at least one guide rail. The guide rails can be configured as profiled rails and the sliding or running bodies can be configured as guide bushes. The guide rails, however, can also be configured as open hollow rails with internally mounted guide rollers as running bodies. Advantageously, in each case a stable guide roller carriage is used as the running body.

In addition to the first upper guide of the first door leaf and the second upper guide of the second door leaf, the door leaves can also be displaceably guided along, in particular, a common lower guide which is designed, in particular, in a rectilinear manner. For example, the door leaves are guided in a lower rail. The upper guides are arranged above the door leaves in a predetermined installed position of the door device. The lower guide is accordingly arranged in the lower region of the door leaves in the predetermined installed position of the door device.

The door leaves are guided by the upper guides and the lower guide in the predetermined installed position at least horizontally and, in particular, transversely to a vehicle longitudinal direction.

According to a further development of the invention, the upper guides, in particular the respective guide rails, are arranged on different sides of the door leaf plane.

A further development provides that the upper guides, in particular the respective guide rails, span a horizontal plane and the plane of the door leaves intersects the horizontal plane spanned by the upper guides centrally between the upper guides. The spacings of the door leaves relative to the upper guides are thus of equal size, measured perpendicular to the door leaf plane.

In a further development, the upper guides comprise in each case at least one guide rail and at least one sliding or running body which is guided in each case along the at least one guide rail, wherein the door leaves are connected in each case to the corresponding sliding or running body of the respective upper guide which is guided along the guide rail. The door leaves are mounted so as to be displaceable along the upper guides by means of the sliding or running bodies. The upper guides can be designed, for example, as guide roller guides, wherein the first door leaf is connected to the first guide rollers guided along the first guide or a first guide roller carriage and the second door leaf is connected to the second guide rollers guided along the second guide or a second guide roller carriage.

In one development, the sliding or running body of the upper first guide, to which the first door leaf is connected, is arranged in the direction of a closing movement of the first door leaf from an open position into a closed position at least partially upstream of the first door leaf. Similarly, in one development, the sliding or running body of the upper second guide, to which the second door leaf is connected, is also arranged in the direction of a closing movement of the second door leaf from an open position into a closed position at least partially upstream of the second door leaf. The sliding or running bodies, for example the guide roller carriages, are arranged in the horizontal direction and, in particular, parallel to the guide rails at least partially, in particular even fully, upstream of the main closing edges of the respective door leaves.

According to one embodiment of the invention, the sliding or running bodies are arranged offset in the direction of movement of the door leaves such that in a closed position of the door device they are arranged level with the respective other door leaf.

In one development, arms can be provided between the door leaves and the respective upper guides, in particular the respective sliding or running bodies, for bridging the spacings between the door leaves and the respective upper guides. The respective arms thus serve for connecting the sliding or running bodies to the respective door leaves and thus for bridging the spacings in the horizontal direction, in particular, in the vehicle longitudinal direction but also in the vehicle transverse direction.

In one development, the first upper guide, in particular the first guide rail, and the second upper guide, in particular the first guide rail, are configured to be of equal length. They are advantageously only sufficiently long for the door leaves to be able to be moved between an open and a closed position. The guides can be of relatively short design due to the parallel arrangement.

According to a further development, the door leaves are connected together via a gear mechanism such that they are displaced in opposing directions between the closed and open position. The coupling via the gear mechanism brings about a forced movement of the door leaves in opposing directions. The displacement of one door leaf between the closed and the open position leads to a movement of the other door leaf in the opposing direction.

In one development, the gear mechanism can be configured as a traction drive with, in particular, a closed belt or a chain, wherein the belt or the chain comprises driver elements, the door leaves being able to be connected or are connected thereby to the belt or the chain at least indirectly, for example via the arms. The driver elements, for example, act on the arms so that the respective door leaves are indirectly connected via the respective arms to the driver elements. Advantageously, the traction drive is configured as a belt drive with a drive belt, in particular a toothed belt.

The belt or the chain can run between, over or below the upper guides, in particular the guide rails, via deflection rollers arranged to the side adjacent to the front faces of the guides, for deflecting the belt or the chain. The closed belt or the chain in this case are wound around the deflection rollers.

The traction device is advantageously arranged at least partially, in particular centrally, for example fully, between the upper guides.

With a central arrangement of the traction drive, the deflection rollers for the belt or the chain, around which the belt or the chain circulates, are oriented toward the upper guides such that the central axes thereof, about which the deflection rollers rotate, are located in the door leaf plane. In a predetermined installed position in the vehicle, the central axes run, in particular, parallel to a vertical axis of the vehicle.

The deflection rollers are advantageously arranged offset on both sides with respect to the upper guides, so that a deflection roller is provided in the region of each front face of the upper guides.

Preferably, the door device comprises a door drive in order to displace the door leaves, actuated by force. The door drive comprises, in particular, an electric motor. The door leaves are displaced by being driven by the electric motor.

Advantageously, the traction drive is actuated by force via the door drive. The traction drive is correspondingly suitably connected to the door drive. The door drive, in particular, is free of a linear drive.

The door drive can also be arranged between the upper guides.

In one development, the vehicle according to the invention is configured as a double-decker rail vehicle, wherein the door device is arranged in an upper deck of the double-decker rail vehicle.

The door device can be encompassed at the side by partition walls which run parallel to the door leaves.

A development of the vehicle according to the invention provides that the upper guide for the first door leaf and the upper guide for the second door leaf are arranged between a ceiling of the vehicle and a roof of the vehicle.

The upper guides for the first and the second door leaf are thus spatially separated from one another. The upper guides are arranged offset with respect to the door leaves, horizontally and perpendicularly to the respective guide direction, on different sides of the door leaf plane and thus spaced apart from one another and spaced apart from the door leaf plane. As a result, it is possible for the upper guides to be of very short design. Thus the door drive can be positioned very high up in the region of a rounded roof portion of the roof of the vehicle, in order to achieve the greatest possible headroom in the interior of the vehicle. The synchronization of the opening and closing movements of the door leaves takes place, for example, via a centrally arranged toothed belt. The drive can also be implemented via the toothed belt. The arrangement of a motor-gear unit of the door drive in this case can be implemented in any manner.

The invention permits numerous embodiments. The invention is described in more detail with reference to the following figures, in which in each case an exemplary embodiment is shown. Elements which are the same are provided with the same reference numerals in the figures.

DETAILED DESCRIPTION OF THE INVENTION

Figure 1:
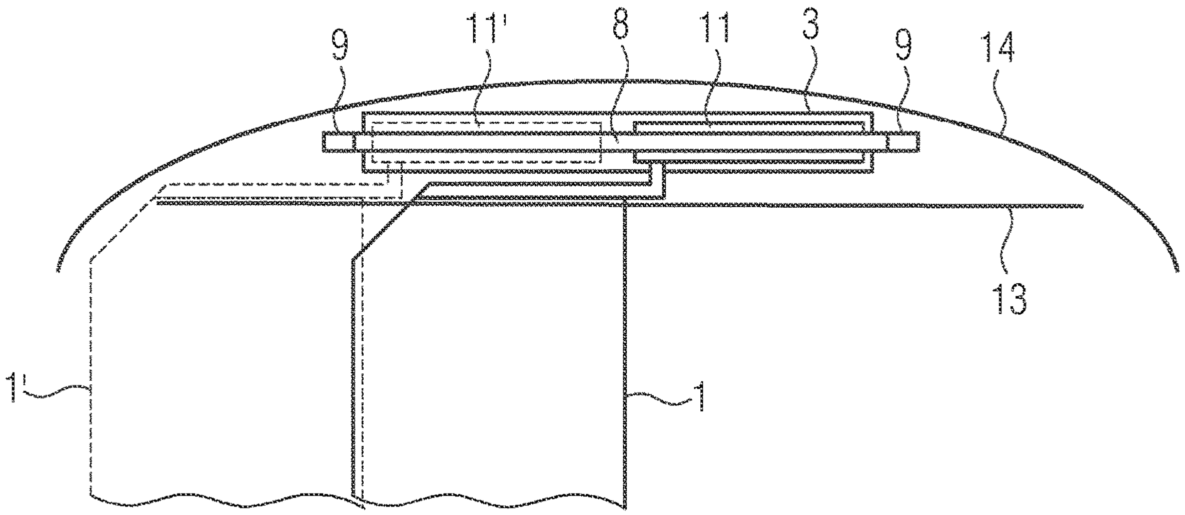
FIG. 1 shows schematically a vehicle according to the invention in cross section.

In FIG. 1 the upper deck of a car body of a double-decker rail vehicle according to the invention of the public passenger transport system is shown with a door device according to the invention in cross section. The roof 14 of the car body of the rail vehicle can be seen, as well as a ceiling 13 defining the interior toward the top, in particular the passenger compartment, of the car body. The ceiling 13 can also form a lower edge of a door lintel. Moreover, a first door leaf 1, 1' of a double-leaf inner sliding door of the door device is illustrated—here only the left-hand door leaf for the sake of clarity. The double-leaf sliding door serves for separating two interiors from one another. In a closed position of the double-leaf sliding door, the first door leaf 1 is illustrated by solid lines. In an open position in the schematic view, the first door leaf 1' is sketched in dashed lines. This nomenclature also applies to further displaceable components. The first door leaf 1, 1' is located in a vertical plane in which a vertical axis and a transverse axis of the car body run.

An upper first guide 3 of the first door leaf 1, 1' is arranged in the ceiling region or roof region, i.e. between the ceiling 13 and the roof 14 of the car body. The upper first guide comprises a first guide rail along which a first running body 11, 11', for example a guide roller carriage, is displaceably guided. The first door leaf 1, 1' is connected in a suitable manner to the first running body 11, 11' via a first arm 5, 5'. In this schematic cross section, the first running body 11, 11' is arranged in the closing direction of the first door leaf 1, 1' from an open position (1') into a closed position (1) upstream of the first door leaf 1, 1', i.e. offset with respect to the first door leaf 1, 1' in the vehicle transverse direction. In the opening direction, the first running body is correspondingly arranged downstream.

The first arm 5, 5' serves for bridging the spacing between the first running body 11, 11' and the first door leaf 1, 1' in the vehicle transverse direction.

Moreover, in this exemplary embodiment a closed drive belt, in this case a toothed belt 8, is provided in the roof region or ceiling region of the car body. The toothed belt is designed to circulate and to be wound around deflection rollers 9. As set forth in more detail below, the first door leaf 1, 1' and thus also the first running body 11, 11' are connected to the toothed belt 8 via driver elements on the toothed belt 8 which act on the first arm 5, 5'. During opening or closing movements of the first door leaf 1, 1', the closed toothed belt 8 is moved in a circulating manner around the deflection rollers. Conversely, a force is applied by the toothed belt 8, which is moved in a circulating manner around the deflection rollers, onto the first door leaf 1, 1' which is used in order to open and to close this first door leaf or the double-leaf sliding door. To this end, a door drive is provided, said door drive also being positioned in the roof region or ceiling region of the car body and being connected to the toothed belt 8 or the deflection rollers 9. This is omitted in the drawings for the sake of simplicity.

Figure 2:
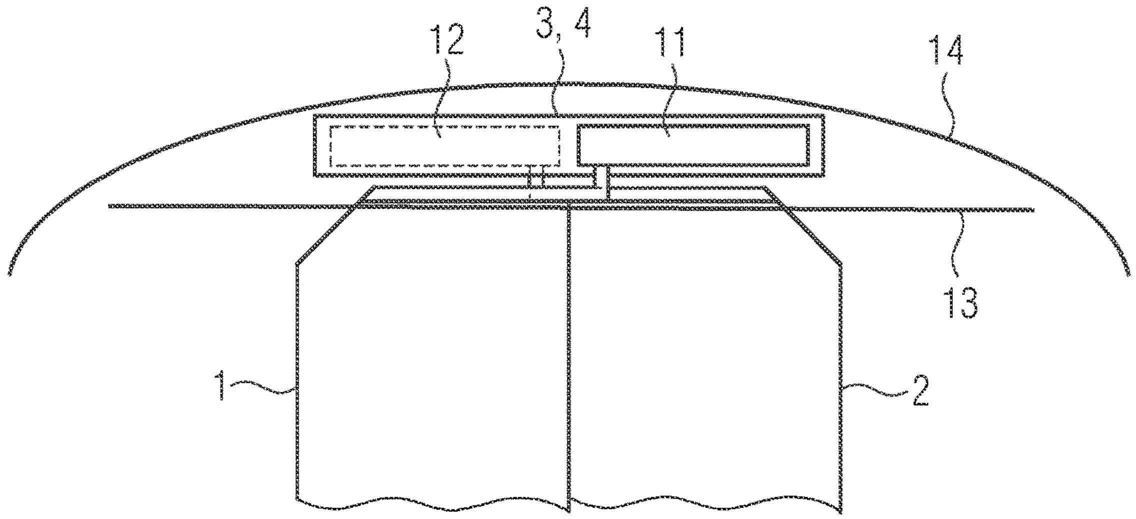
FIG. 2 shows the vehicle of FIG. 1 with the two door leaves in the closed position.
Figure 3:
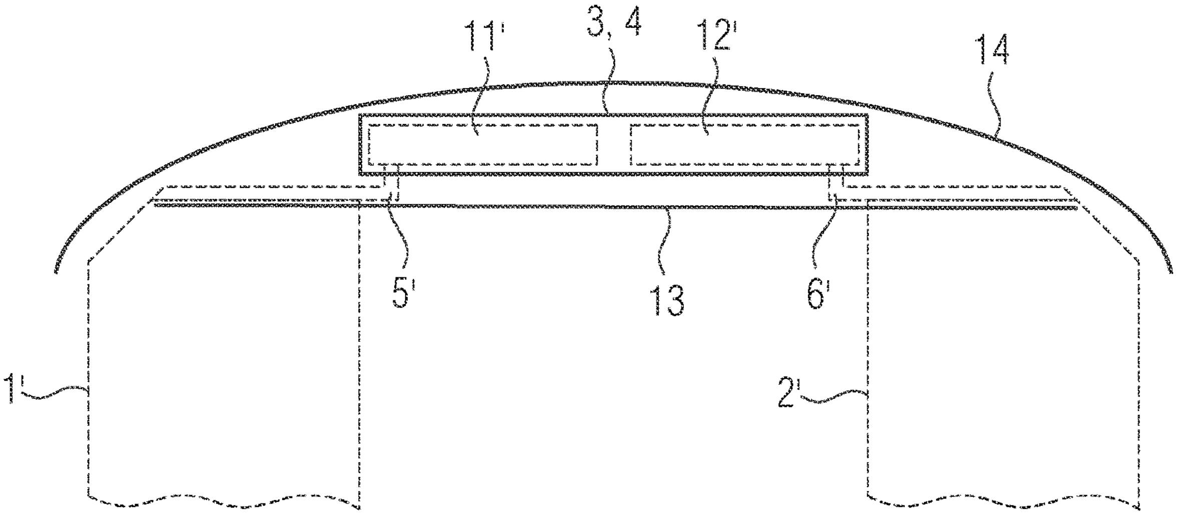
FIG. 3 shows the vehicle of FIG. 1 with the two door leaves in the open position.

Naturally, these embodiments relative to the first door leaf 1, 1' also apply equally to a second door leaf 2, 2' of the double-leaf sliding door, as shown in FIG. 2 and FIG. 3. FIG. 2 illustrates the double-leaf sliding door in the closed position, FIG. 3 equally in the open position. The reference numerals 2, 6 and 12 in this case denote the second door leaf 2, a second arm 6 and a second running body 12 in the closed position, and the reference numerals 2', 6' and 12' in this case refer accordingly to the aforementioned positions in the open position.

In the closed position according to FIG. 2 it can be clearly identified that both respective running bodies 11 and 12 are offset in the direction of movement to the respective corresponding door leaves 1 and 2 in the vehicle transverse direction, such that they are located level with the respective other door leaf 1, 2 and are located parallel thereto.

Figure 4:
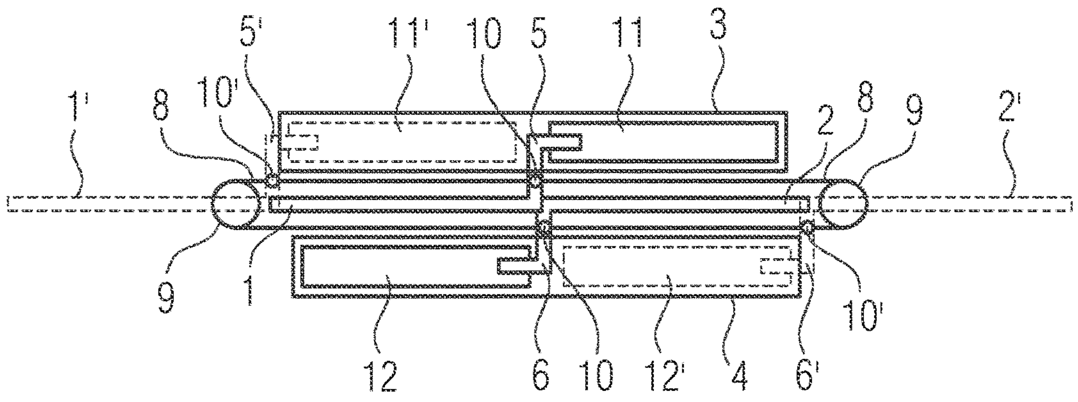
FIG. 4 shows schematically the vehicle according to the invention in a horizontal longitudinal section.

While it is difficult to identify it in the cross sections, it is illustrated in FIG. 4, which shows the door device according to the invention, that the first upper guide 3 for the first door leaf 1, 1' is spatially separated from a second upper guide 4 for the second door leaf 2, 2'. The upper guides 3, 4 are arranged offset to one another perpendicularly to the respective guide direction of the door leaves 1, 1' and 2, 2' on different sides of a plane of the door leaves 1, 1' and 2, 2' and thus arranged spaced apart from one another and spaced apart from the door leaf plane. Thus the door leaves 1, 1' and 2, 2' are not only offset in the vehicle transverse direction and thus in the direction of movement of the door leaves 1, 1' and 2, 2' but also offset to the respective running body 11, 11' and 12, 12' in the vehicle longitudinal direction and thus perpendicularly to the door leaf plane. The respective guide rails of the upper guides 3 and 4 run parallel to one another and parallel to the plane of the door leaves 1, 1' and 2, 2'. In this case, the guide rails of the first upper guide 3 and the second upper guide 4 are arranged such that the plane of the first door leaf 1, 1' and of the second door leaf 2, 2' is arranged centrally therebetween, i.e. with the same spacing in each case. The respective spacings in the vehicle longitudinal direction between the door leaves 1, 1' and 2, 2' and their respective running bodies 11, 11' and 12, 12' are in turn bridged by the respective arms 5, 5' and 6, 6'.

The traction drive 7 with the toothed belt 8 and the deflection rollers 9 is also arranged centrally between the upper guides 3, 4. The vertical plane of the door leaves 1, 1' and 2, 2' intersects the imaginary horizontal plane, in which both guides 3, 4 are located, centrally between the guides 3, 4.

The axes of the deflection rollers 9 are located in the plane of the door leaves 1, 1' and 2, 2'.

The door leaves 1, 1' and 2, 2' are fastened via the arms 5, 5' and 6, 6' to driver elements 10, 10' of the toothed belt 8. These driver elements are arranged between the deflection rollers 9 on the portions which move in opposing directions of the toothed belt 8 which is wound around the deflection rollers 9 so that the door leaves 1, 1' and 2, 2' are moved and thus the inner door opens or closes.

By separating the upper guides 3, 4 and the respective horizontal and vertical offset of the door leaves 1, 2 to the running bodies 11, 12 thereof, the guides 3, 4 can be of short design and thus take up less installation space in the vehicle transverse direction, which is advantageous, in particular, in the case of double-decker vehicles in the upper deck by the roof line sloping steeply to the side.

The invention claimed is:

1. A door device for an interior of a passenger transport vehicle, the door device comprising:

- a double-leaf sliding door having a first door leaf and a second door leaf disposed in a common plane;
- an upper guide for said first door leaf and an upper guide for said second door leaf;
- said upper guides being arranged parallel to one another;
- said upper guides being arranged on mutually different sides of said common plane of said first and second door leaves; and
- at least said upper guide for said first door leaf being arranged offset with respect to said common plane of said first and second door leaves.

2. The door device according to claim 1, wherein each of said upper guides comprises at least one guide rail and at least one sliding or running body guided along said at least one guide rail, and wherein each of said door leaves is connected to a respective one of said sliding or running bodies guided along a respective one of said guide rails.

3. The door device according to claim 2, wherein:

- said sliding or running body of said upper guide for said first door leaf is arranged in a direction of a closing movement of said first door leaf from an open position into a closed position at least partially ahead of said first door leaf; and/or
- said sliding or running body of said upper guide for said second door leaf is arranged in a direction of a closing movement of said second door leaf from an open position into a closed position at least partially ahead of said second door leaf.

4. The door device according to claim 1, wherein said upper guides span a horizontal plane and said common plane of said first and second door leaves intersects the horizontal plane spanned by said upper guides centrally between said upper guides.

5. The door device according to claim 1, which comprises at least one arm between said first door leaf and said upper guide for said first door leaf and at least one arm between said second door leaf and said upper guide for said second door leaf, each said at least one arm bridging a spacing between said door leaf and the respective said upper guide.

6. The door device according to claim 1, wherein said upper guide for said first door leaf and said upper guide for said second door leaf are of equal length.

7. The door device according to claim 1, comprising a gear mechanism connecting said first and second door leaves to one another and causing said first and second door leaves to move in opposing directions relative to one another.

8. The door device according to claim 1, comprising a traction drive with a belt or a chain, said belt or said chain having driver elements connected to, or to be connected to, said first and second door leaves, respectively.

9. A door device for an interior of a passenger transport vehicle, the door device comprising:

a double-leaf sliding door having a first door leaf and a second door leaf disposed in a common plane;

an upper guide for said first door leaf and an upper guide for said second door leaf, said upper guides being arranged parallel to one another, and at least said upper guide for said first door leaf being arranged offset with respect to said common plane of said first and second door leaves; and a traction drive with a belt or a chain, said belt or said chain having driver elements connected to, or to be connected to, said first and second door leaves, respectively;

wherein said traction drive is at least partially arranged between said upper guides.

10. The door device according to claim 8, wherein said traction drive includes deflection rollers for said belt or said chain, said deflection rollers having axes located in said common plane of said first and second door leaves.

11. The door device according to claim 8, further comprising a door drive configured to displace said first and second door leaves by force actuation.

12. A passenger transport vehicle, comprising:

a door device in an interior of the vehicle, the door device including:

a double-leaf sliding door having a first door leaf and a second door leaf disposed in a common plane;

an upper guide for said first door leaf and an upper guide for said second door leaf;

said upper guides being arranged parallel to one another;

at least said upper guide for said first door leaf being arranged offset with respect to said common plane of said first and second door leaves; and wherein said upper guide for said first door leaf and said upper guide for said second door leaf are arranged between a ceiling of the vehicle and a roof of the vehicle.

13. The vehicle according to claim 12, configured as a double-decker rail vehicle having an upper deck, and wherein said door device is disposed in the upper deck of the double-decker rail vehicle.

* * * * *